(12) United States Patent
Wicklund

(10) Patent No.: US 6,337,860 B1
(45) Date of Patent: Jan. 8, 2002

(54) REDUNDANCY TERMINATION

(75) Inventor: Göran Wicklund, Nacka (SE)

(73) Assignee: Telfonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/477,549

(22) Filed: Jan. 4, 2000

Related U.S. Application Data

(63) Continuation of application No. PCT/SE98/01381, filed on Jul. 13, 1998.

(30) Foreign Application Priority Data

Jul. 11, 1997 (SE) .............................. 9702692

(51) Int. Cl.7 .......................... H04L 12/50; H04L 12/28; H04L 12/56; H04Q 11/00
(52) U.S. Cl. ....................... 370/387; 370/390; 370/417
(58) Field of Search .................. 370/367, 368, 370/386, 387, 390, 395, 398, 411, 417, 418, 419, 389, 536, 412; 714/819–821; 340/825.07

(56) References Cited

U.S. PATENT DOCUMENTS

| | | | |
|---|---|---|---|
| 4,447,903 A | * 5/1984 | Sewerinson | 714/821 |
| 4,630,258 A | * 12/1986 | Mcmillen et al. | 370/411 |
| 5,150,360 A | * 9/1992 | Perlman et al. | 370/402 |
| 5,268,909 A | 12/1993 | Loebig | 714/800 |
| 5,361,255 A | 11/1994 | Diaz et al. | 370/374 |
| 5,485,453 A | * 1/1996 | Wahlman et al. | 370/389 |
| 5,537,400 A | 7/1996 | Diaz et al. | 370/412 |
| 5,577,035 A | * 11/1996 | Hayter et al. | 370/395 |
| 5,677,931 A | * 10/1997 | Okuyama et al. | 375/260 |
| 5,963,553 A | 10/1999 | Wicklund | 370/390 |

FOREIGN PATENT DOCUMENTS

| | | |
|---|---|---|
| EP | 0 572 831 A2 | 12/1993 |
| EP | 0 603 916 A2 | 6/1994 |
| WO | 93/15579 | 8/1993 |

* cited by examiner

Primary Examiner—Wellington Chin
Assistant Examiner—Kevin C. Harper
(74) Attorney, Agent, or Firm—Nixon & Vanderhye P.C.

(57) ABSTRACT

In a switch having two parallel planes (A, B) for providing redundancy, cells are received from the two planes in redundancy terminating unit comprising that first the cells are separated whether they are ordinary switched cells, called unicast cells, or cells which are switched or copied to a plurality of the outputs of the planes, these cells being called multicast cells. At each cell time a selection of one received cell is made by a selector control unit (3) and this selection is made substantially at random, among possible received unicast cells and a multicast cell as stored in a FIFO (35) having an output register (37). If received cells have different priorities the random selection is made among cells having the maximum priority of the priority of the received cells. A unicast cell which is not selected, is discarded but a non-selected multicast cell remains in the register until it is selected. This random plane selection is executed in a fast and simple way and give a very quick response to many faults in the switch core.

20 Claims, 4 Drawing Sheets

REDUNDANCY TERMINATION

This application is a continuation of PCT/SE98/01381 filed Jul. 13, 1998.

TECHNICAL FIELD

The present invention relates to a device for redundancy termination of cell streams incoming from two parallel switching planes.

BACKGROUND

Switches for e.g. ATM-networks are required to switch cells in a data cell stream at a very high speed from the input ports to the output ports thereof. Some of the processing inside such switches is always performed in a parallel way, using a high clock frequency, the processing being made by hard-wired components not requiring any soft-ware. In order to obtain a sufficient reliability the switches are often duplicated, so that for each switch, also called plane, is a parallel plane arranged. At the outputs ports of two parallel planes only one cell of the two cells obtained from the planes at each cell time must be selected, this procedure being called redundancy termination.

A general problem related to ATM-switches having redundancy in the shape of two identical, parallel switching planes operating independently of each other is that the two planes do not execute their switching operations synchronously. Thus, in selection situation different results can be obtained, i.e. different cells are selected. If the switch receives two cells, which are to be switched to the same output port, one of the planes can select one of the cells and the other plane the other cell, i.e. the results from the two planes are different. Further, if buffers are arranged in the switch, one can obtain quite different sequences of cells out of the two planes. Thus, it will be difficult for the receiver of the cell sequences to determine the plane from which it is to take cells. A frequent method of solving this problem is to determine to always take cells from one plane. If this plane goes faulty, quite a long time can elapse before the defectiveness of the plane is detected when the other plane is selected. During the time period from the occurrence of an error up to the change of plane several cells can get lost.

Such a switch core switching cells from a plurality of input ports to a plurality of output ports can in some cases handle two different kinds of cells which are transmitted in different ways. The first kind of cells, also called unicast cells, are transmitted through the switch core in the conventional way, being routed from an input port to a definite output port which may be specified in a header portion of the cell. The second kind of cells, also called multicast cells, are almost simultaneously transmitted to all the output ports of the switch core or to a group of output ports. When the transmission over such a switch core is made redundant by introducing a second switch core operating in parallel to and independently of the first switch core, also problems related to in particular the multicast cells may arise when a termination of the redundant planes has to be made.

A redundancy termination device for an ATM-switch is disclosed in the published International patent application WO 93/15579. In the conventional way the cell arriving first to the termination device is selected. However, in a fast ATM-switch having planes operating in relatively primitive way, i.e. in a directly parallel and simple way, no such timing differences may exist. Cells transferred through the parallel planes will then always arrive at a definite time and a selection cannot be based on time differences. Also, the processing required for processing times may too consuming in itself. In a fast switch, also some kind of confirming receipt of cells is required, such as disclosed in e.g. U.S. Pat. No. 5,361,255. Acknowledging/negatively acknowledging signals are then as conventional sent to the source issuing the cells.

SUMMARY

It is an object of the present invention to provide a redundancy termination reducing the risk of loosing cells in the case where one of parallel planes goes defective.

The problem solved by the invention is thus how to provide, in a fast switch having parallel planes, a redundancy termination which can work sufficiently fast and has a quick response to faults so that losses of cells are minimized in the case of a fault.

This object is generally achieved by always listening to all parallel planes, at each instant when a cell selection is to be made, and then making a best choice in the selecting process.

In a switch having two parallel switching operating independently for providing redundancy to the switch, cells are received from the two planes by a redundancy terminating unit. This unit has simple switching means separating the received cells according to whether they are ordinarily switched cells, called unicast cells, or cells which are switched or copied to a plurality of the outputs of the planes, these cells being called multicast cells. At each cell time a selection of one received cell is made by a selector control unit and this selection is made substantially at random, among possible received unicast cells and a multicast cell as stored in a buffer memory of the type first-in-first-out. If received cells have different priorities the random selection is made only among cells having the maximum priority of the priority of the received cells. A unicast cell which is not selected is discarded but a non-selected multicast cell remains in the buffer until it is selected. This random plane selection is executed in a fast and simple way and gives a very quick response to many faults in the switch core.

Thus, in a switch having at least two parallel switching planes, each switching plane receiving cells to provide a cell stream on each of the outputs of the plane, a redundancy terminating unit is provided connected to only one output of each plane for receiving parallel cell streams from each connected output. The redundancy terminating unit comprises a selector unit which each cell time selects one cell substantially at random from one of the parallel cell streams, so that the selected cell then is output or transmitted from the redundancy terminating unit and the non-selected cell can be discarded. Often cells have different priorities and then the selector unit selects a cell at random only among cells having the same priority, this priority being the highest one of the priorities of the cells among which the selection is made.

To provide for a secure transport of cells the selector unit can send an acknowledging message for a cell which is selected and a negatively acknowledging message for a cell which is not selected, these messages being sent to some earlier stage transmitting cells to the planes. A cell for which a negatively acknowledging message has been received by such an earlier stage can then be retransmitted to the switching planes.

Further, the cells transmitted in the switch can be different kinds, such as unicast cells or multicast cells, where the unicast cells are switched in the ordinary way to only one output of each switching plane and the multicast cells are switched to a group of outputs of each switching plane, such a group then holding at least two outputs. A buffer memory in the redundancy terminating unit can then be connected to receive only multicast cells from the outputs of the planes and then the selector can make its selection of a cell among unicast cells received each cell time and one cell stored in the buffer memory, preferably that cell stored in the buffer memory, which has been stored there for the longest time.

For managing the buffer memory control means can be provided which removes a multicast cell stored in the buffer memory only when this multicast cell has been selected by the selector unit, this implying that every multicast cell will be eventually selected and that no multicast cell will be discarded in the selection process, what can happen for unicast cells. Also, a filter unit may be arranged in the redundancy terminating unit, which receives multicast cells and discards such multicast cells, a copy of which has been earlier stored in the buffer memory. In that way, such earlier stored multicast cells will not be stored once more in the buffer memory. A line from the buffer memory to the selector unit can signal that the filling level in the buffer memory is too high, i.e. higher than some predetermined threshold value, and the selector unit will when receiving such signalling always select a cell from the buffer memory and not among possible unicast cells.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

DETAILED DESCRIPTION

Figure 1:
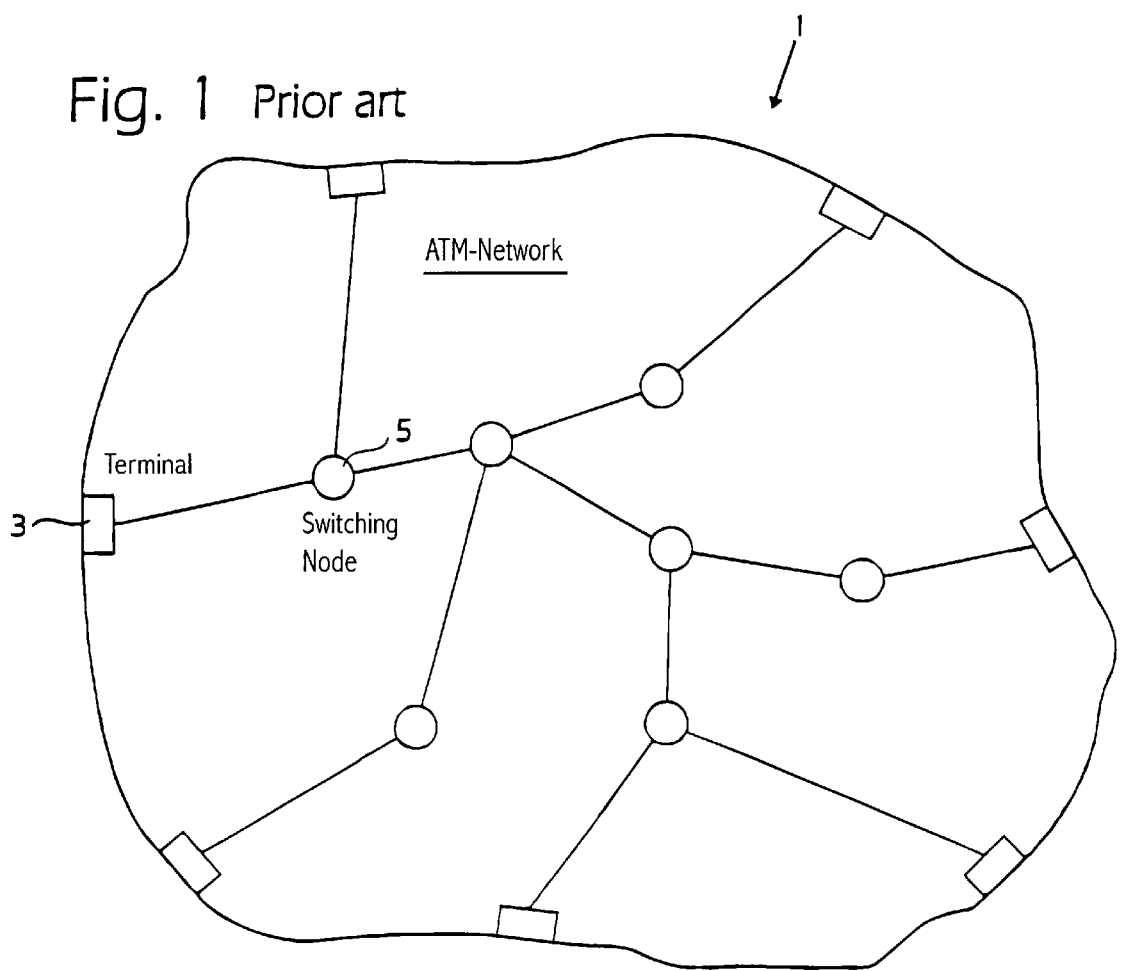
FIG. 1 is a diagram illustrating a simple network.

In FIG. 1 a network 1 of for example the ATM-type is illustrated having terminals or input and output stations 3, which are connected to other network links, subscribers, etc. Each terminal 3 is connected to an ATM-switching node 5. The nodes 5 are connected in a suitable way to each other, so that a message can be sent from every terminal 3 to any other terminal.

The nodes 5 contain switching units operating at a high speed. Such a switching unit must have a very high reliability and therefor different types of redundancy are built into the units. A common way to provide redundancy is to arrange an extra, parallel switch element or plane for all switch elements of such a switching unit. Then two parallel cell streams are obtained from each such pair of primary switch elements and these cell streams have to be combined into one cell stream in the best possible way. Such a combining operation is called termination of redundancy or redundancy termination.

The following description of termination of redundancy applies to a complete switching unit built of the circuits QRT and QSE manufactured by the company IgT. However, the redundancy termination can be used in all switching units behaving in a way substantially or generally identical to or analogously to this switching unit.

Figure 2:
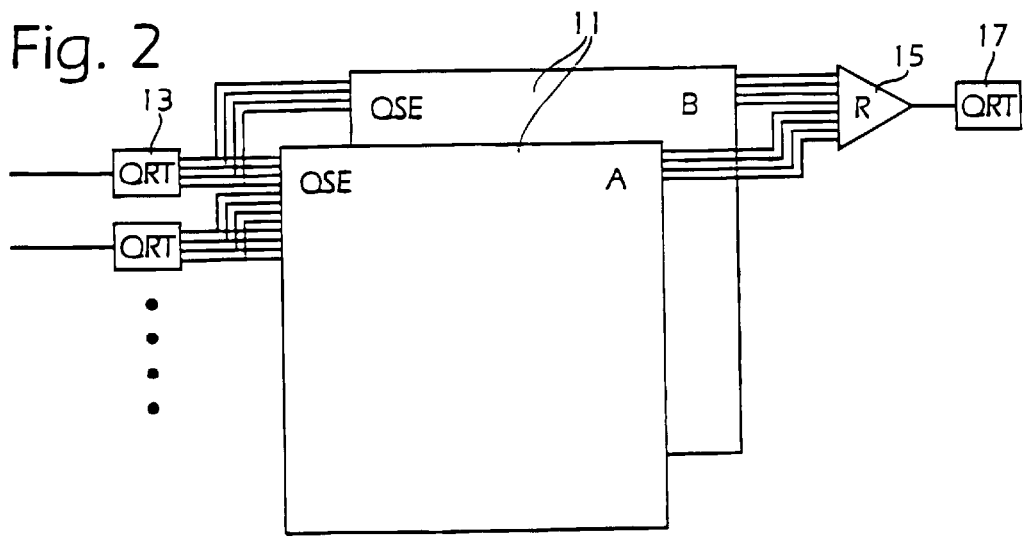
FIG. 2 is a block diagram illustrating a complete switching unit.

The QSE circuit 11 used in the switching unit of FIG. 2 has 32 input ports and 32 output ports. The input unit 13 connected to the inputs ports of a QSE 11 can be the circuit QRT as indicated at 13. The QSEs can be used as single switches in for example a small ATM-network but they can also be interconnected in different ways in order to build switch fabrics having different sizes. Such a switch fabric can be composed of e.g. three stages of QSEs. A QRT has four outputs and may then be connected to 1, 2 or 4 different QSEs. In the switching unit of FIG. 2 the outputs of the QRTs are all connected to different inputs of the same QSE 11.

In order to build a fault tolerant switch fabric, at least in some stages a redundancy can be provided by arranging for each switch core or QSE a parallel QSE, the two parallel QSEs working independently of each other and receiving the same cell streams. In the simple switching unit of FIG. 2 there are thus two parallel QSEs 11. Cells from the ingress QRTs 13 are then copied to both planes 11 and transmitted therethrough. At the egress side of the two planes 11, for each pair of correspondingly numbered output ports thereof, a plane selection must be made so that a cell stream is obtained containing cells selected in the best possible way to ensure that cells are transported securely and as fast as possible through the switch fabric. This function is indicated by the redundancy terminating units 15, each such redundancy unit 15 being connected to two correspondingly numbered output ports of the QSEs 11. Finally the cell stream produced by the redundancy terminating units 15 continues to egress QRTs 17 forming an outgoing interface of the switching unit.

The switching unit of FIG. 2 can be assumed to be clocked by both a bit clock signal having a very high rate and a cell clock signal having a lower rate, the interval between each cell clock signal comprising a definite number of intervals between bit clock signals, i.e. the cell clock signal occurring each Mth bit clock signal where M according the ATM-standard can be equal to 118. The time at which a cell clock signal occurs is called a cell time and the time at which a bit clock signal occurs is call a bit time.

The cells of the streams transmitted through the switch cores 11 are assumed to be either unicast type or multicast type. A unicast cell is switched in the conventional way to only one output port of the QSE 11 as determined by some routing information which can be assumed to be provided in a header of the cells. A multicast cell is transported from one input port to all output ports or a group of output ports comprising at least two ports. A multicast cell has no explicit routing information in its header, but a bit which is set in the header and signals that the cell is multicast type. However, a multicast cell has an identifier in the cell which is used for addressing a memory in the QSE. Data in this memory indicate those outputs to which this cell is to be copied (bitmap).

A QSE has no buffering facilities for unicast cells. Collisions between unicast cells may occur when at the same time at least two unicast cells are switched to the same output port and then one of the cells is selected and the other cell or cells are dropped or discarded. Then an acknowledging signal ACK or a negatively acknowledging signal NACK can be transmitted backwards through the switch along a path parallel to that of the cell as set up and arranged by special means inside the QSE. The ACK signal is sent in the case where a cell has reached an output port of the QSE and is selected there. The NACK signal is sent in the case where a cell has reached an output port and is not selected there, i.e. is dropped. The positively and negatively acknowledging signals are normally received by the input device of the QSE such as a QRT and this device can then retransmit a cell for which an NACK has been received.

For multicast cells buffers are provided in a QSE. A multicast cell received by the QSE is stored in such a buffer and remains stored there until the stored cell has been validly copied to all the output ports to which it is to be forwarded according to the bitmap information contained in said memory of the QSE. Thus, collisions are avoided for multicast cells and it is ensured that a multicast cell will always be transmitted on the desired outputs. No acknowledging/negatively acknowledging signals are thus needed for multicast cells.

Figure 3:
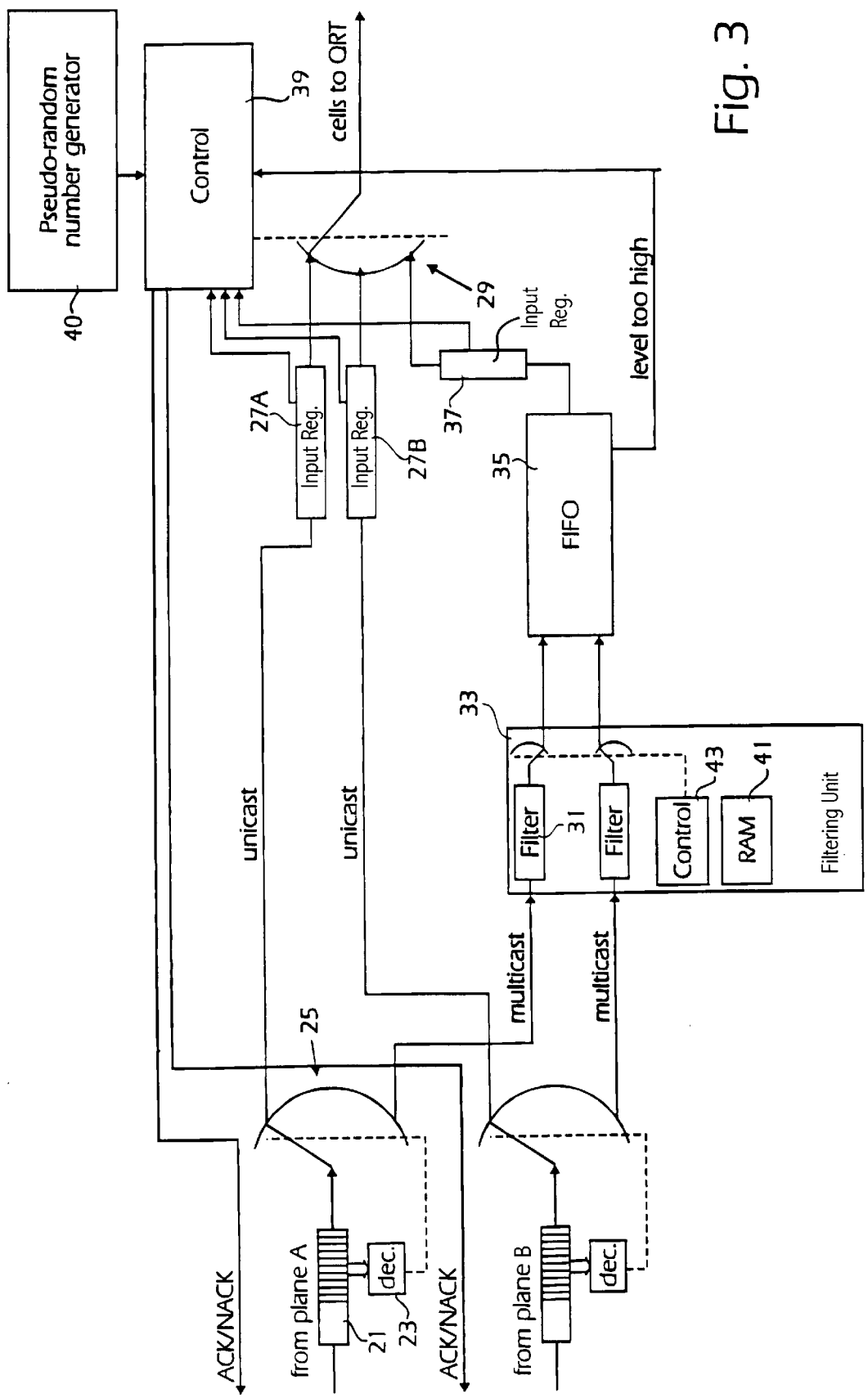
FIG. 3 is a block diagram of a redundancy terminating unit.

In the case where two parallel planes are used for redundancy reasons the same functions of acknowledging/negatively acknowledging unicast cells and buffering multicast cells must be provided in units terminating the parallel planes. Such a plane selection function is executed in the redundancy terminating units 15, the construction of which is illustrated in the schematic diagram of FIG. 3. Cells arriving from one of the two planes 13 A, B are provided to a register 21 in which the bit signifying multicast/unicast is extracted by a decoding unit 23. The decoding unit 23 provides a signal for controlling a separating switch 25, connected to the register 21 and receiving the cell stored therein.

Thus cells are separated into unicast and multicast cells, the unicast cells being provided to input registers 27A, 27B of a selector switch 29, where the register 27A receives cells from plane A and the register 27B receives cells from plane B, if any. The multicast cells are fed to registers 31A, 31B in a filter function 33, where the register 31A receives cells from plane A and register 31B receives cells from plane B. The filtering unit 33 will drop a received cell or write it into a FIFO 35 connected to the output of the filter 33. The filter function will be described hereinafter. During one cell interval, one or two cells may be written into the FIFO 35, but only one cell is read out therefrom. The cell which is read out is fed to an input register 37 of the selector switch 29, to which also the registers 27 holding the unicast cells from the two planes are connected.

The selector switch 29 will select one of the two unicast cells in the registers 27A, 27B or the multicast cell in the register 37 and coming from the FIFO 35, depending on the priority of the cells. Thus, a control unit 39 is connected to these registers 27A, 27B, 37 and is capable of accessing priority bits in the headers of the stored cells. In the case where two of the cells stored have equal priority higher than that of the possible third one or there are three cells which have the same priority, a random selection of a cell is made. The random selection can be made according to the signal from a pseudo-random number generator indicated at 40 of any kind known in the art, such as a pseudo-random number generator constructed of a plurality of connected shift registers. However, if the multicast FIFO 35 is almost full, the selector switch 29 will take a cell from it. For that reason the control unit 39 is connected to the FIFO 35 in order to receive a signal when the filling level of the FIFO is too high. When a selection has been made, a unicast cell which has not been selected is discarded whereas, in the case where the multicast cell stored in the register was not selected it remains stored in that register until it will be selected.

If a unicast cell has been selected from a plane, the control unit 39 also gives an acknowledging signal ACK back to that plane. If a unicast cell is selected and the unicast cells from the two planes as simultaneously stored in the registers 27 are the same cells, i.e. for the ATM-case have the same connection number and sequence number as carried in the cell header, the ACK signal will be sent back to both planes. If a unicast cell has been received and is not selected, a negatively acknowledging signal NACK will be sent to plane, on which this cell arrived.

The filter 33 for multicast cells will not accept a cell from a plane if the same cell has already been received from the other plane. Thus, in the filter unit 33 a memory 41 is arranged in which identifying information of the cells, i.e. in the ATM-case the connection and sequence numbers, from those last N multicast cells are stored, which have been transferred to the FIFO 35. The number N is decided by the maximum cell skew between the two planes. This skew may for a one stage switch core as that illustrated in FIG. 2 be up to 64 cells, but this is extremely unlikely. The filter unit 33 also comprises a control unit 43 connected to the registers 31A, 31B of the filter and takes identifying information therefrom, i.e. the connection and sequence number in the ATM-case, and compares it to all the entries in the memory 41, one by one. One bit clock cycle will be required for each comparison, so that a memory having 64 entries will require 64 bit clock cycles, which is within the limit of one cell time which can here be assumed to be 118 cycles as in the ATM-case. For two received multicast cells the comparisons are performed in parallel to each other. If a larger number N is needed, the memory 41 can be divided into parallel blocks, comprising one comparator per block, all these comparators operating in parallel to other ones comparing to the records stored in the same memory 41. If a cell is accepted, i.e. if it has not been received earlier, the identifying information of the cell, i.e. the connection and sequence numbers thereof, is written into the memory 41 at the last or oldest position therein, after all the other entries. The memory 41 is preferably organized as a cyclic memory and then the cell information now entered is written on top of the oldest cell information.

Figure 4:
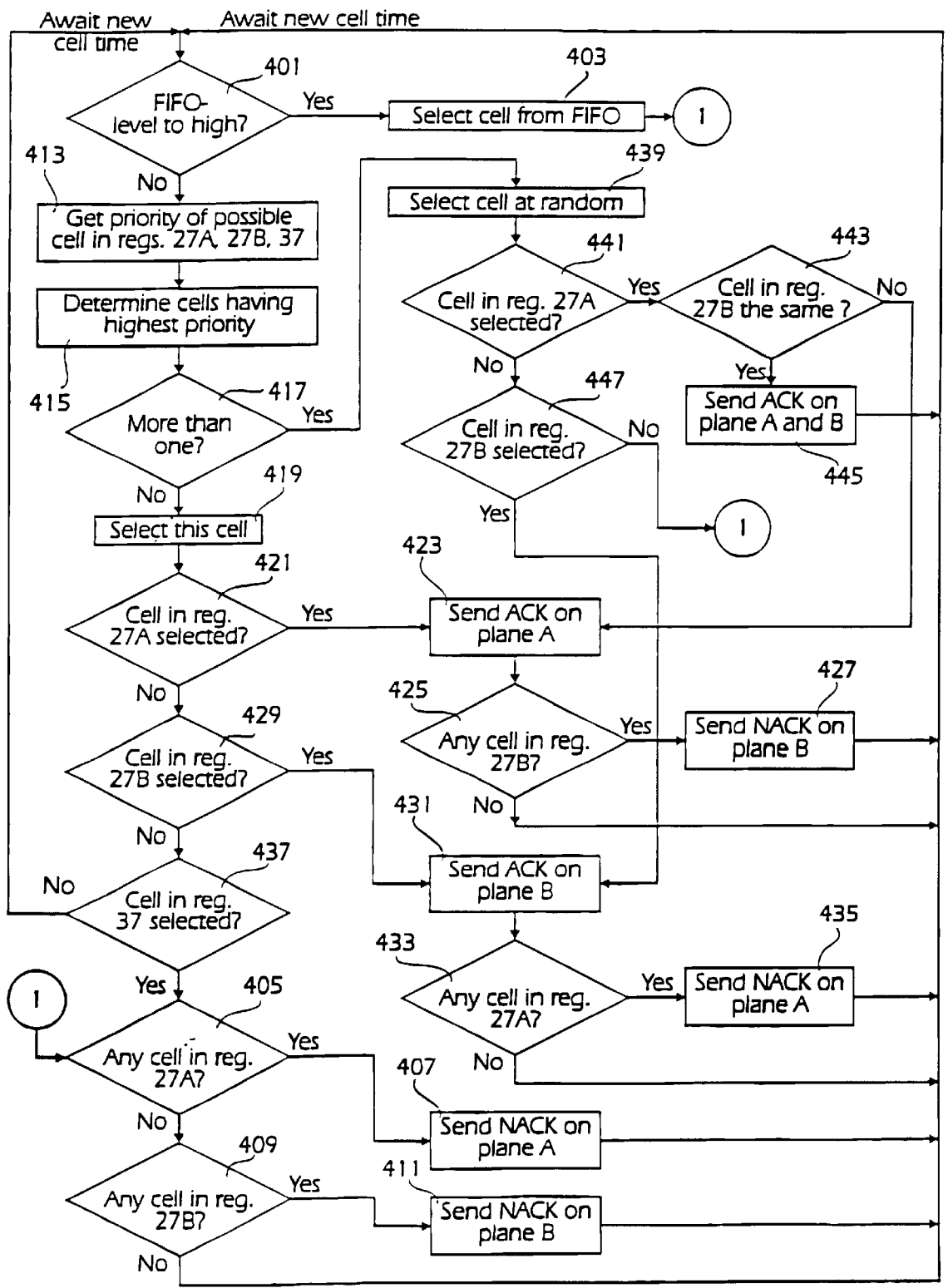
FIG. 4 is a flow diagram of the different steps to be performed in the selection procedure in the redundancy terminating unit of FIG. 3.

The functional steps executed by the control unit 39 of the selector switch 29 are summarized in the flow diagram of FIG. 4. Then, at the start of a new cell time, in a block 401 the signal from the FIFO 35 is checked whether the filling level is too high. If it is too high, a block 403 is executed in which the next cell selected is taken from the register 37 as the next output cell of the FIFO 35 and this cell is sent to the QRT 17, see FIG. 2. In the next block 405 it is determined whether a cell exists in the register 27A, and if it decided to be true, a negatively acknowledging signal, called an NACK signal, is sent to plane A in a block 407. If no cell exists in the register 27A, instead a block 409 is executed where it is asked whether a cell exists in the register 27B. If it is decided that a cell exists there, a block 411 is executed in which a negatively acknowledging signal NACK is sent to plane B.

If the FIFO level was determined not to be too high in block 401, a block 413 is executed, in which the priority information of the cells stored in the unicast registers 27A, 27B and the output register 37 of the FIFO 35 are accessed. In the next block 415 the priorities are compared and the maximum priority thereof is determined and those registers are determined which hold cells having this maximum priority. Then, in a block 417 it is decided whether the number of cells having this maximum priority are more than one. It only one cell has the maximum priority, this cell is selected in a block 419 and forwarded to the connected QRT. In a block 421 it is then decided whether the cell in the unicast register 27A was selected. If it is decided to be true, a block 423 is executed in which a positively acknowledging signal ACK is sent back on plane A. Thereafter, in a block 425 is asked whether there is a cell stored in the register 27B and if it is true, an NACK signal is sent on plane B in a block 427. Then a new cell time is awaited until the block 401 is executed anew, what also happens when it is decided in the block 425 that no cell isstored in the register 27B.

If it was decided in the block 421 that the cell in register 27A was not selected, a block 429 is executed in which it is decided whether the cell in the unicast register 27B was selected. If it is the case, a block 431 is executed, in which an acknowledging signal ACK is sent back on plane B. In the next block 433 it is decided whether a cell is stored in the unicast register 27A. If a cell is stored there, an NACK signal is in a block 435 sent on plane A. Then a new cell time is awaited and then the block 401 is executed. The same applies if it was decided in the block 433 that no cell was stored in the register 27A.

If it was determined in the block 429, that the cell in the register 27B was not selected, a block 437 is executed, in which it is determined whether a cell in the multicast register 37 was selected. If it is the case, the block 405 is executed as described above. If it was determined in the block 437 that a multicast cell was not selected, a new cell tine is awaited and then the procedure starts all over again.

If it was decided in the block 417 that more than one cell has the maximum priority, a block 439 is executed in which one of the cells having the maximum determined priority as stored in the registers is selected at random, using a random number generated by some generator such as the pseudo-random number generator 40, and forwarded to the QRT. Then it is asked in a block 441 whether the cell in the unicast register 27A was selected. If it is the case, it is decided in a block 443 whether the identity information of the cells in the unicast registers 27A and 27B is the same. If it is true, a block 445 is executed in which acknowledging signals ACK are sent to both planes A and B. Then a new cell time is awaited and the block 401 is executed again. If it was determined in the block 443 that the identity information is not the same, the block 423 is next executed as described above. If it was determined in the block 447 that the cell in the unicast register 27B was selected, the block 431 is executed and then a new cell time is awaited.

The operations of the control unit 43 of the filter 33 will next be described with reference to the flow diagram of FIG. 5. At the start of a new cell time, in a block 501 the identity information of the cells in the registers 31A, 31B in the filter unit 33 is accessed. Then it is decided in a block 503 whether this identity information is equal. In the case where it is not equal two sequences of operational steps are executed in parallel to each other. Thus in each sequence a block 505A, 505B is executed in which the identity information of the cell in the register 31A or 31B respectively is compared to the identity information stored in the memory 41 pointing to cells previously stored in the FIFO 35. In the next respective block 507A, 507B it is decided whether the information was found and if it was not found, a block 509A, 509B is executed. Here the cell in the register 31A or register 31B respectively is transferred to the FIFO 35 and the identity information of the cell is copied to or stored also in the memory 41. A new cell time is then awaited in order to start the procedure again in the block 401.

In the case where the decision of the block 503 gave the answer that the considered cells had the same or equal identity information a block 511 is executed in which the identity information of the cell in the multicast register 31A is compared to the identity information in the memory 41 of cells earlier stored in the FIFO 35. In the next block 513 it is decided whether this information existed in the memory 41 and if it did not exist, a block 515 is executed. In the block 515 the cell in register 31A is transferred to the FIFO 35 and the identity information of the cell is stored in the memory 41. Then a new cell time is awaited and then the block 501 is performed again. The same is true in the case where the decision of the block 513 is that the cell stored in the register 31B had been previously transferred to the FIFO register 35.

Figure 5:
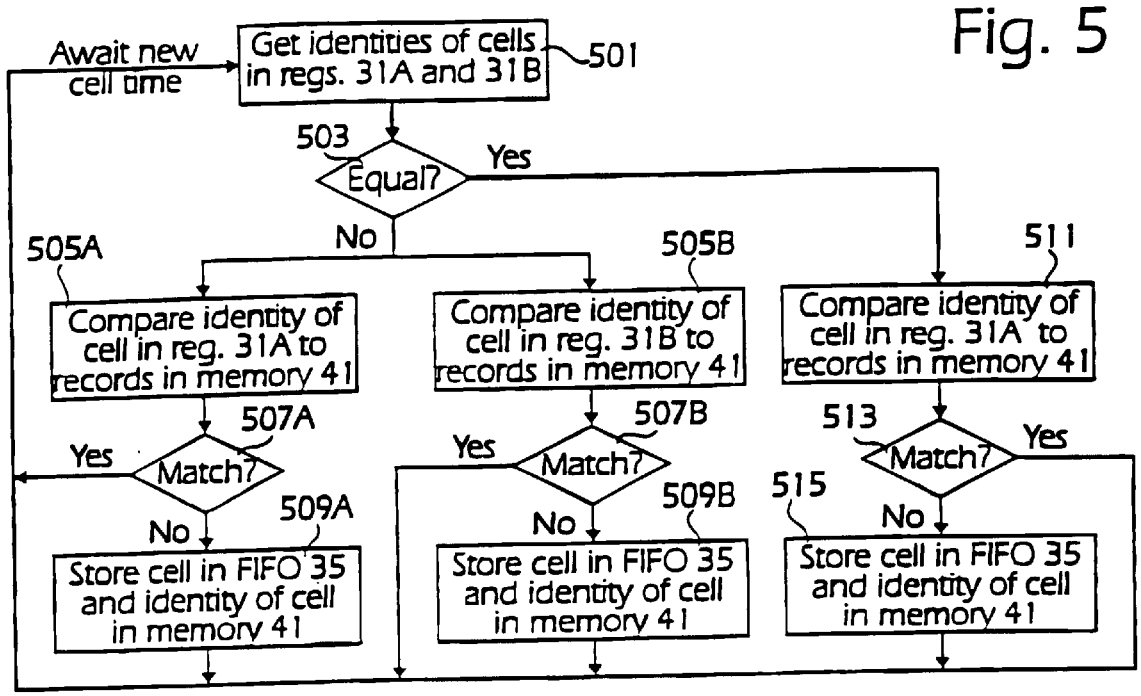
FIG. 5 is a flow diagram of the steps to be executed when storing special cells in a FIFO-memory in the redundancy terminating unit of FIG. 3.

The description above is in some aspects only schematic or a principle description, focusing on the logical steps which are executed, in particular the flow diagrams of FIGS. 4 and 5. It must be understood that the procedural steps thereof are in many cases executed in parallel by specially designed processors or simple logical circuits operating in parallel, as is obvious to one skilled in the art. The registers of FIG. 3 may not all be physically implemented as separate registers but some of them may be the same ones, such as the input registers 21 and the unicast registers 27A, 27B. The register 37 may not exist physically but can be pointer to a place in a memory field holding the stored cells.

The plane selection as described above gives a very quick response to many faults in the switch core, these faults most often appearing as loss of cells. E.g. faulty I/O can occur in the switching planes such as an input or output being always bound to a logical level which cannot be changed. The simple plane selection as described herein can be supplemented with other supervising functions, e.g. a parity check, connection establishment checks, checking test cells etc.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

What is claimed is:

1. A switch comprising at least two switching planes, each having inputs and outputs, between which cells are switched to provide a cell stream on each of the outputs of each plane, a redundancy terminating unit being connected to only one output of each plane for receiving parallel cell streams from each connected output and comprising a selector unit selecting one cell at a time from one of the parallel cell streams, wherein the selector unit is arranged to select a cell substantially at random from one of the parallel cell streams; and wherein the switch is for switching cells which are either unicast cells or multicast cells, the unicast cells being switched in an ordinary way to an output of each switching plane and the multicast cells being switched to a group of outputs of each switching plane, characterized by a buffer memory in the redundancy terminating unit connected to receive multicast cells from the outputs of the planes which are connected to the redundancy terminating unit, the selector unit being arranged to select a cell among unicast cells received each time and one cell stored in the buffer memory.

2. A switch according to claim 1 for switching cells which are either unicast cells or multicast cells, the unicast cells being switched in an ordinary way to an output of each switching plane and the multicast cells being switched to a group of outputs of each switching plane, characterized by a buffer memory in the redundancy terminating unit connected to receive multicast cells from the outputs of the planes which are connected to the redundancy terminating unit, the selector unit being arranged to select a cell among unicast cells received each time and one cell stored in the buffer memory.

3. A switch according to claim 2, characterized by a line from the buffer memory to the selector unit, the line being arranged to carry a level signal signalling that a filling level in the buffer memory is higher than a predetermined value, the selector unit being arranged to always select a cell from the buffer memory when receiving the level signal.

4. A switch according to claim 2, characterized in that the selector unit is arranged to select a cell among unicast cells received each time and that cell stored in the buffer memory, which has been stored in the buffer memory for the longest time.

5. A switch according to claim 2, characterized by control means controlling the buffer memory, the control means being arranged to remove a multicast cell from the buffer memory only when this multicast cell has been selected by the selector unit.

6. A switch according to claim 2, characterized by a filter unit in the redundancy terminating unit, the filter unit being connected to receive multicast cells from the two switching planes and to discard multicast cells, a copy of which has been earlier stored in the buffer memory, so that such multicast cells are not stored in the buffer memory.

7. A switch comprising at least two switching planes, each having inputs and outputs, between which cells are switched to provide a cell stream on each of the outputs of each plane, a redundancy terminating unit being connected to only one output of each plane for receiving parallel cell streams from each connected output and comprising a selector unit selecting at each time one cell from only one of the parallel cell streams and discarding cells from the other ones of the parallel cell streams, wherein the selector unit is arranged to select a cell substantially at random from one of the parallel cell streams.

8. The switch of claim 7, wherein the at least two switching planes operate in parallel to each other, so that cells are provided on the outputs of the planes only at definite cell times.

9. The switch of claim 7 for switching cells having at least two different priorities, wherein the selector unit is arranged to select a cell at random only among cells having the same priority as received in the parallel cell streams.

10. The switch of claim 9, wherein the selector unit is arranged to select a cell only among cells having the priority which is the highest one of those of the cells.

11. The switch of claim 7, wherein the selector unit is arranged to send an acknowledging message for a cell which is selected.

12. The switch of claim 7, wherein the selector unit is arranged to send a negatively acknowledging message for a cell which is discarded.

13. The switch of claim 7, wherein the selector unit is arranged to send a negatively acknowledging message for a unicast cell which is discarded.

14. A switch for switching cells which are either unicast cells or multicast cells, the switch comprising at least two switching planes, each having inputs and outputs, between which cells are switched to provide a cell stream on each of the outputs of each plane, a redundancy terminating unit being connected to only one output of each plane for receiving parallel cell streams from each connected output and comprising a selector unit selecting at each time only one cell, each unicast cell switched in an ordinary way to an output of each switching plane and the multicast cells switched to a group of outputs of each switching plane, the redundancy terminating unit comprising a buffer memory connected to receive multicast cells from the outputs of the at least two switching planes, the selector unit arranged to select at random a cell among unicast cells received at each time and one multicast cell stored in the buffer memory.

15. The switch of claim 14, wherein the at least two switching planes operate in parallel to each other, so that cells are provided on the outputs of the at least two switching planes only at definite cell times.

16. The switch of claim 14, wherein the selector unit is arranged to send an acknowledging message for a unicast cell which is selected.

17. The switch of claim 14, wherein the selector unit is arranged to select a cell among unicast cells received at each time and that cell stored in the buffer memory, which has been stored in the buffer memory for the longest time.

18. The switch of claim 14, further comprising control means controlling the buffer memory, the control means being arranged to remove a multicast cell from the buffer memory only when the multicast cell has been selected by the selector unit.

19. The switch of claim 14, further comprising a filter unit in the redundancy terminating unit, the filter unit connected to receive multicast cells from the at least two switching planes and to discard multicast cells, a copy of which has been earlier stored in the buffer memory, so that such multicast cells are not stored in the buffer memory.

20. The switch of claim 14, further comprising a line from the buffer memory to the selector unit, the line being arranged to carry a level signal signalling that a filling level in the buffer memory is higher than a predetermined value, the selector unit being arranged to always select a cell from the buffer memory when receiving the level signal.

* * * * *

UNITED STATES PATENT AND TRADEMARK OFFICE
CERTIFICATE OF CORRECTION

PATENT NO. : 6,337,860 B1  
DATED : January 8, 2002  
INVENTOR(S) : Wicklund

Page 1 of 1

It is certified that error appears in the above-identified patent and that said Letters Patent is hereby corrected as shown below:

<u>Title page,</u>
Item [73], Assignee is incorrectly spelled. Should be: -- Telefonaktiebolaget LM Ericsson --.

Signed and Sealed this

Thirtieth Day of April, 2002

Attest:

JAMES E. ROGAN  
*Attesting Officer*     *Director of the United States Patent and Trademark Office*